United States Patent
Agresta et al.

(10) Patent No.: US 6,920,892 B2
(45) Date of Patent: Jul. 26, 2005

(54) SIDE SPRAY DIVERTER VALVE

(75) Inventors: Frank Agresta, Wallingford, CT (US); Frederick L. Luedke, Waterbury, CT (US)

(73) Assignee: Neoperl, Inc., Waterbury, CT (US)

( * ) Notice: Subject to any disclaimer, the term of this patent is extended or adjusted under 35 U.S.C. 154(b) by 113 days.

(21) Appl. No.: 10/669,827

(22) Filed: Sep. 24, 2003

(65) Prior Publication Data

US 2005/0061368 A1 Mar. 24, 2005

(51) Int. Cl.[7] ............................................. F16K 11/048
(52) U.S. Cl. ................................... 137/119.04; 137/597
(58) Field of Search ........................ 137/119.03, 119.04, 137/119.08, 119.09, 597

(56) References Cited

U.S. PATENT DOCUMENTS

| | | |
|---|---|---|
| 2,587,961 A | 3/1952 | Bletcher et al. |
| 2,949,933 A | 8/1960 | Moan |
| 3,459,207 A * | 8/1969 | Bacheller ............... 137/119.04 |
| 3,895,643 A | 7/1975 | Ward |
| 4,008,732 A | 2/1977 | Fichter et al. |
| 4,609,006 A * | 9/1986 | Parkison et al. ........ 137/119.04 |
| 4,934,402 A | 6/1990 | Tarnay et al. |
| 5,114,072 A | 5/1992 | Barhydt, Sr. |
| 5,279,329 A | 1/1994 | Pippel |
| 5,472,010 A | 12/1995 | Gonzalez |
| 5,752,541 A * | 5/1998 | Gonzalez ............... 137/119.04 |
| 5,795,475 A | 8/1998 | Luedke et al. |
| 6,126,093 A | 10/2000 | Grether et al. |
| 6,152,182 A | 11/2000 | Grether et al. |

* cited by examiner

Primary Examiner—Ramesh Krishnamurthy
(74) Attorney, Agent, or Firm—McCormick, Paulding & Huber LLP

(57) ABSTRACT

A side spray diverter valve with anti-siphoning and flow regulation of the water diverted to the spray head. A ported valve plunger sliding in a sleeve admits water from the inlet to the spout in one position while a lower O-ring seals the spray outlet. In the other position, the sleeve has axially directed ports which screen and trap particulates in the water over a predetermined size. The flow rate of screened water to the spray is regulated by the lower O-ring pressing against grooves in the wall of the sleeve.

14 Claims, 3 Drawing Sheets

SIDE SPRAY DIVERTER VALVE

BACKGROUND OF THE INVENTION

Figure 1:
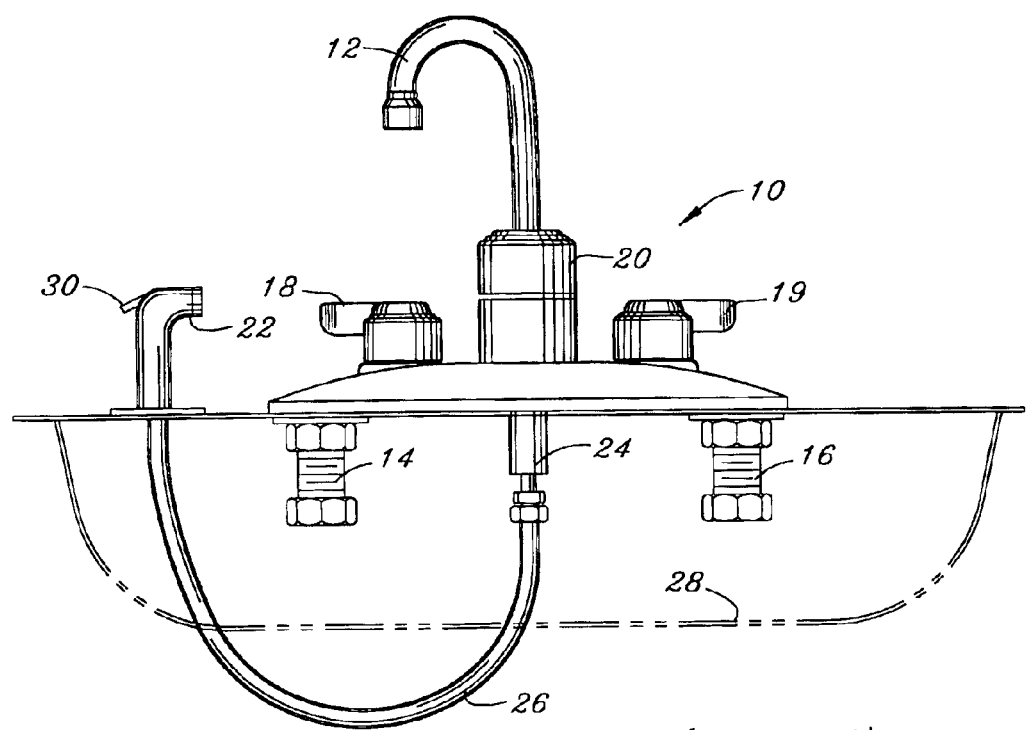

This invention relates generally to valves for diverting the flow of fluid from one outlet to another, and more particularly to a side spray diverter valve used in plumbing faucets with a separate hose-connected side spray.

Diverter valves are known in the prior art for a faucet which directs water to either the faucet spout or to a spray nozzle connected to the faucet assembly by a hose. When the spray nozzle is activated, the corresponding drop in water pressure in the spray hose activates the diverter valve so as to divert the water from the normal faucet spout through which it is flowing to the spray nozzle outlet. The water supply is usually from both a hot water line and a cold water line, usually associated with a mixing valve to adjust the water temperature, although a diverter valve could operate with only a single source of water under pressure.

A number of diverter valves or transfer valves are known in the prior art, which have been designed to meet the problems associated with residential water supplies. One problem is that of particulate material in the water. Although the usual residential faucet spout is fitted with an aerator having filters to trap particulate matter, this is not effective in the case of particulate matter passing through the diverter valve which can become trapped between the moving parts and interfere with proper operation. Another problem for diverter valves connected to an outlet attached to a hose, which could become immersed in a sink of dirty water, is the requirement that the diverter valve be of an anti-siphon type. This requirement is found in American Society of Sanitary Engineering (A.S.S.E.) standard no. 1025 stating that there be no back-siphonage of water through the spray or hose when the control valve of the spray is defective or open and a vacuum is applied to the faucet inlet. Further requirements are that a diverter valve meet high temperature and water pressure requirements, that it meet minimum flow requirements both at the faucet spout outlet and at the hose spray outlet when the spray is activated, and that it shall not permit more than a specified leakage at the spout outlet when the hose spray is activated. Therefore, the diverter valve should be constructed in such a manner that it meet these requirements and have provisions for reducing possibility of particulate matter blocking flow passages and affecting the performance of the diverter valve.

A prior art diverter valve is known in U.S. Pat. No. 2,587,961 issued Mar. 4, 1952 to Bletcher et al., who disclose a transfer valve which incorporates an anti-siphonic means to prevent water from flowing backwards from the spray outlet into the water supply line should a vacuum condition occur. The transfer valve incorporates a pressure actuated control valve to divert water at the inlet into the spray outlet when the spray head is actuated, and a separate check valve to prevent flow through the spout outlet should pressure in the water inlet be reduced.

U.S. Pat. No. 2,949,933 issued Aug. 23, 1960 to Moen discloses a spray diverter valve suitable for a water faucet with an inlet mixture of hot and cold water, comprising a sleeve with inlet ports registering with the water supply mixing chamber, and a valve seat controlling flow to the spout outlet. An unrestrained valve piston opens and closes the flow to the spout outlet in response to pressure changes when the spray handle is actuated. Flow to the spray outlet takes place around a piston with a flexible downwardly flaring skirt. Also, pressure in the inlet causes the skirt to seal against the inner surface of the sleeve and movement of the valve seat to eliminate suction through the inlet. The possibility of particulate matter becoming lodged in the clearances introduces the possibility of malfunctions of either the movable valve seat or the piston.

U.S. Pat. No. 4,934,402 issued Jun. 19, 1990 to Tarnay et al. addresses the problem of possible malfunction of the foregoing Moen type diverter valve by reversing the orientation of the skirt on the piston to provide a positive seal, and providing a separate bypass channel to the spout outlet so that there is no flow past the piston, thereby eliminating the possibility of particulates jamming the valve. The bypass channel includes a precision size orifice so that any particulate matter that passes through the orifice will not be trapped. The Tarnay diverter valve requires the addition of another valve and valve seat, thereby adding to the cost of the prior art valves shown by Moen and Bletcher. Since there is a fixed restriction in the bypass line, there is no flow regulation to the spray head. This means that there will be greater flow of water to the spray head at higher pressure resulting in excess flow, and lower flow at lower pressure, resulting in insufficient flow.

Accordingly, one object of the present invention is to provide an improved diverter valve for diverting flow from a spout outlet to a spray outlet when the spray head is actuated, which also incorporates protection against siphoning contaminated water through the spray outlet to the water supply when water inlet pressure is reduced.

Another object of the invention is to provide an improved diverter valve which reduces possibility of jamming any moveable parts with particulate matter.

Another object of the invention is to provide an improved diverter valve with flow regulation to the spray outlet when the spray head is actuated.

Another object of the invention is to provide an improved diverter valve with a minimum of working parts suitable for general use in a variety of diverter valve applications.

SUMMARY OF THE INVENTION

Briefly stated, the invention comprises a valve sleeve with an upper valve seat, radially directed ports into the sleeve from a water inlet, axially directed ports through the sleeve from the water inlet, a lower valve seat, and flow regulating grooves in the wall of the sleeve. A valve plunger within the sleeve has a valve head for sealing the upper valve seat to the spout, a lower valve head for sealing the lower valve seat to the spray outlet plunger ports which admit water from the radially directed ports in the sleeve to the spout when the plunger is in an upper position, and through the axially directed ports in the sleeve past the lower valve seat to the spray outlet when the plunger is in the lower position. In the latter position, the lower valve head regulates flow past the flow regulating grooves, while the axially directed ports in the sleeve screen and prevent the entry of larger particulate matter into the flow regulating grooves.

In its preferred form, the invention comprises a diverter valve adapted to be received within a faucet assembly having at least one water inlet, a spout outlet and a spray outlet, the diverter valve comprising a cylindrical valve sleeve having a sleeve wall defining a central passage therethrough, the central passage communicating at an upper end thereof with the spout outlet and at a lower end thereof with the spray outlet, a central wall portion of the sleeve wall communicating on the outer surface thereof with at least one water inlet, the central wall portion having a plurality of radially directed inlet ports and a plurality of axially spaced, axially directed inlet ports, a spout valve seat defined by the sleeve wall at the upper end of the central passage, a spray valve seat defined by the sleeve wall, the spray valve seat being axially spaced from the spout valve seat on the other side of the central wall portion, and a plurality of circumferentially spaced flow regulating grooves defined in the sleeve wall between the spray valve seat and the lower end of the central passage. Inside the sleeve is a cylindrical valve plunger having a plunger wall dimensioned to slide axially with close clearances within said sleeve wall, the plunger having a transfer chamber closed at opposite axial ends of the plunger wall, a lower valve head arranged to seal the spray valve seat when the plunger is in an upper axial position, an upper valve head arranged to seal the spout valve seat when the plunger is in a lower axial position, a plurality of plunger inlet ports and a plurality of plunger outlet ports defined in the plunger wall and communicating with the transfer chamber, the plunger inlet and plunger outlet ports being axially spaced from one another and arranged to register with the upper end of the central passage and with the radially directed inlet ports respectively when the plunger is in the upper position so as to admit water from the water inlet through the transfer chamber to the spout outlet, and to be blocked when the plunger is in the lower position, the axially directed inlet ports being arranged to screen and admit a screened flow of water between the sleeve and plunger to the spray outlet, the lower valve head being adapted to cooperate with the flow regulating grooves to regulate the screened flow when the plunger is in the lower position.

DRAWING

Figure 2:
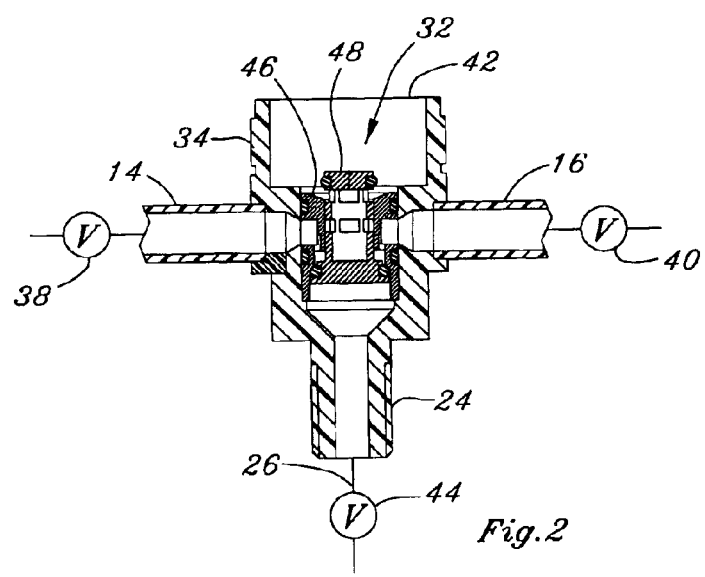
Figure 3:
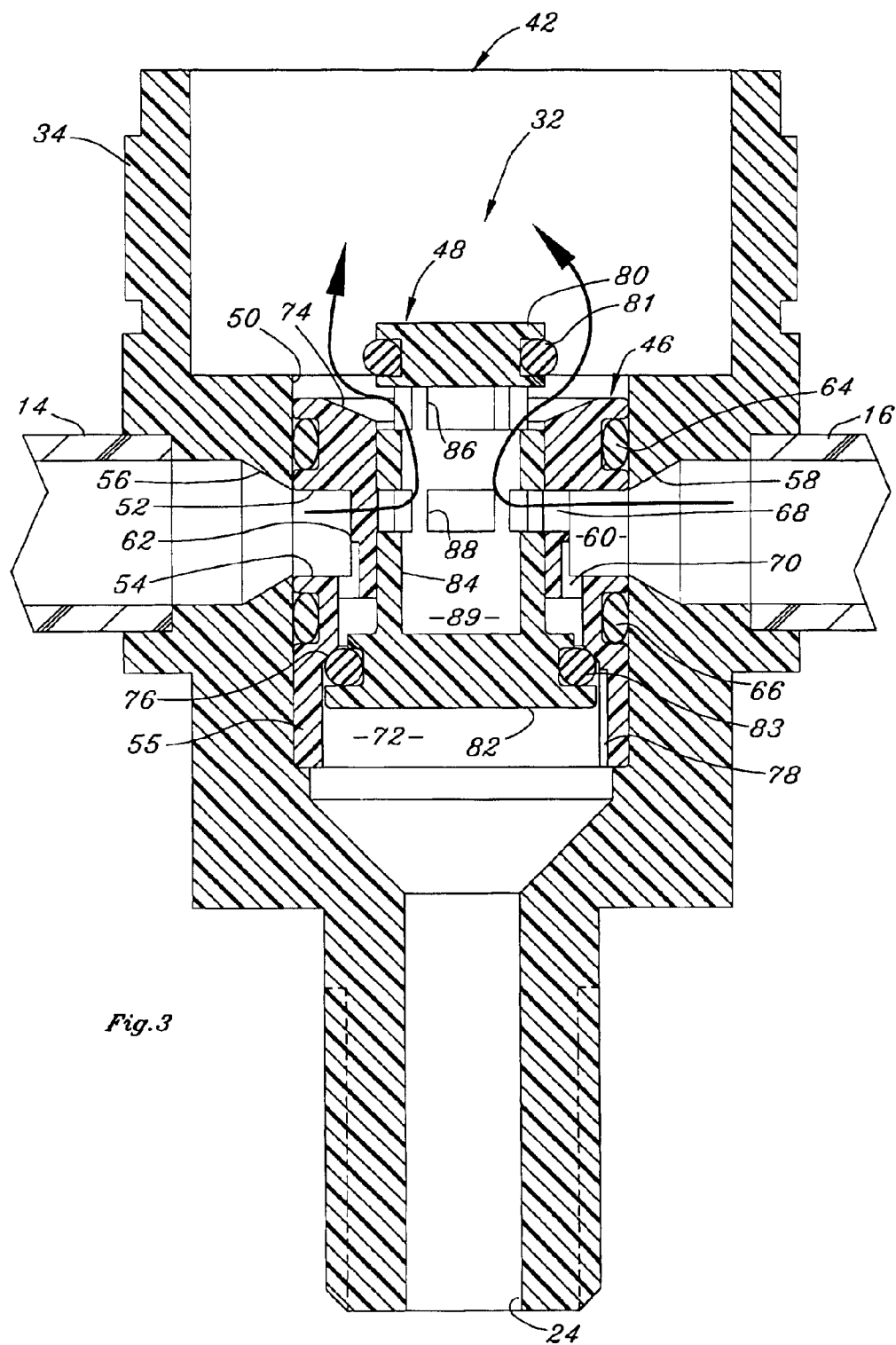
Figure 4:
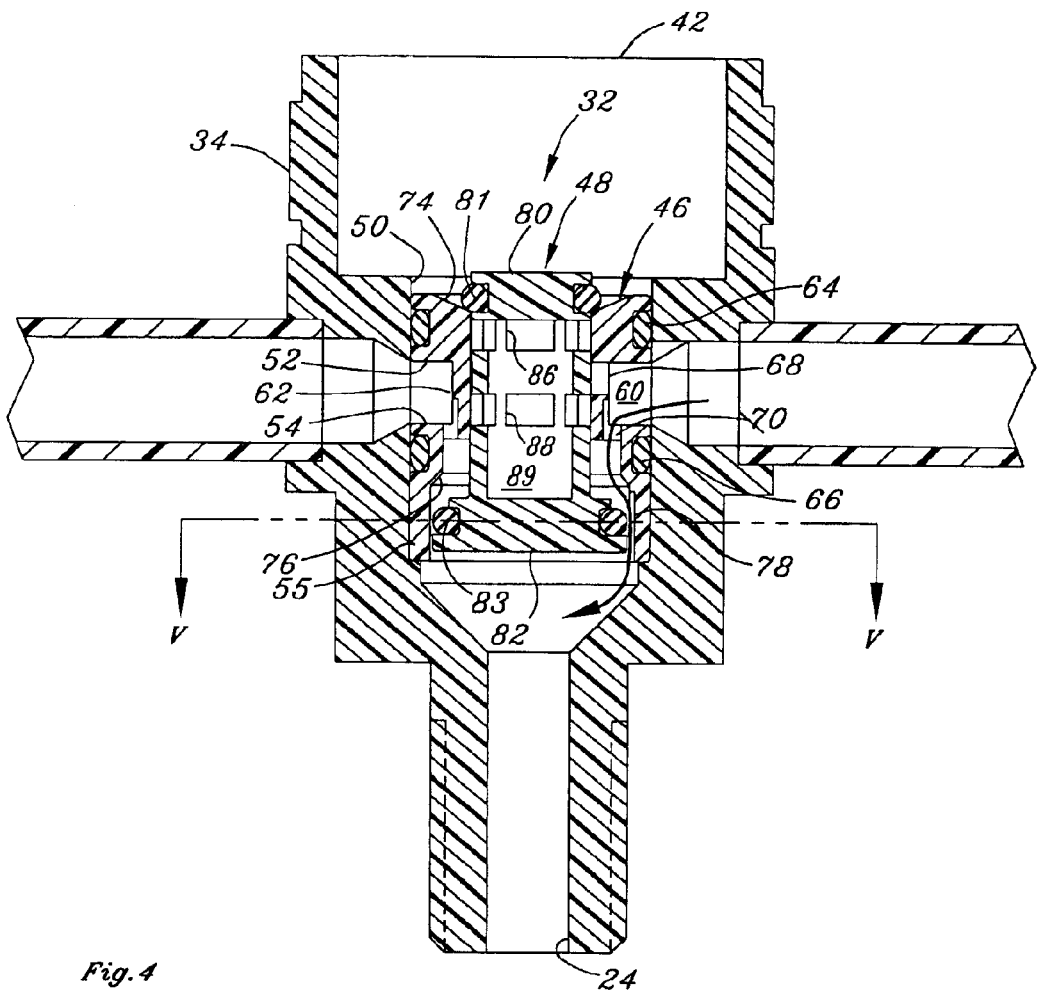
Figure 5:
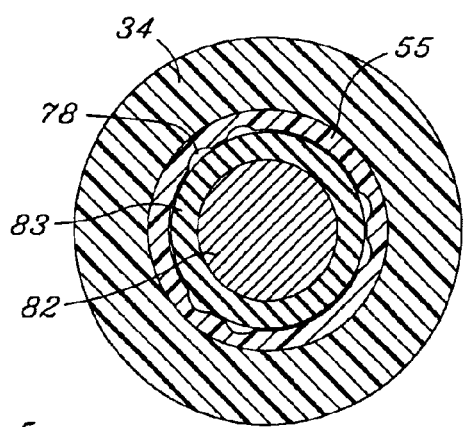

The invention, together with other objects and advantages thereof, will be better understood by reference to the following description, taken in connection with the accompanying drawing, in which:

FIG. 1 is a simplified elevation view of the faucet assembly with side spray,

FIG. 2 is an elevation view, in cross section, of a side spray diverter valve according to the present invention showing the water inlet valves and spray valve in schematic form, FIG. 3 is an enlarged elevation view in cross section, of the diverter valve assembly with diverter valve plunger in an upper position for flow to the spout, FIG. 4 is a view of the valve of FIG. 3 with the plunger in a lower position for regulated flow to the spray valve outlet, and FIG. 5 is plan view in cross section, taken along lines V—V of FIG. 4.

DETAILED DESCRIPTION OF THE INVENTION

Referring to FIG. 1 of the drawing, a faucet assembly, shown generally at 10 is of the temperature mixing type having a faucet spout 12, hot and cold water inlet connections 14, 16 respectively controlled by handles 18 and 19. An alternate prior art arrangement might use a single handle to control both rate of flow and temperature of the water. A diverter valve (not shown) in accordance with the present invention is mounted inside a faucet assembly base 20. A side spray nozzle 22 is connected to a spray outlet 24 opposite the outlet to spout 12 by a flexible hose 26. A sink receptacle 28 with a drain (not shown) is provided for waste water from spout 12 or spray 22. The spray 22 is actuated by a spray handle 30 actuating an internal valve (not shown). The foregoing is a description of a well-known type of residential sink application with separate hose-connected side spray according to the prior art.

Referring now to FIG. 2 of the drawing, a cross sectional view is shown of a diverter valve assembly indicated generally at 32, which is located inside of or a part of a valve body 34. The valve body 34 may take many forms according to the manufacturer of the particular faucet assembly 10. The size and configuration of valve body 34 is not a material part of the present invention. The diverter valve assembly 32 is a unit which is inserted into valve body 34. The hot and cold water inlets 14, 16 are supplied through valves 38, 40 respectively at water system pressure, which can vary between 20 to 100 psi according to the type of system. The valves 38, 40 are controlled by handles 18, 19 respectively. The upper end of valve body 34 comprises a spout outlet 42 leading to spout 12 which is open to atmospheric pressure. Spout 12 usually includes an aerator with a filter to catch particulate matter flowing through the open spout outlet 42. The lower end of valve body 34 forms part of the spray outlet 24 connected through a valve 44 in the spray nozzle 22.

In accordance with the present invention, the diverter valve assembly 32 is disposed in a cylindrical bore in the valve body 34, and comprises a cylindrical valve sleeve 46 with a plunger 48. Plunger 48 is arranged to move between an upper and a lower position within sleeve 46 to function in a manner to be described.

Referring now to FIG. 3 of the drawing, an enlarged view is shown of the valve sleeve 46 with the valve plunger 48 in an uppermost position. Sleeve 46 is sealingly disposed within a cylindrical bore 50 of valve body 34, and comprises a cylindrical body with axially spaced upper and lower flanges 52, 54 bridging a hot water inlet port 56 and cold water inlet port 58 cut in the wall of valve body 34 and supplied by hot water and cold water lines 14, 16 respectively. Hot and cold water inlets 56, 58 lead to a circumferential mixing chamber 60 partially defined by a reduced diameter section 62 of the valve sleeve 46.

The water inlet mixing chamber 60 is sealed by an upper O-ring 64 and lower O-ring 66 disposed in circumferential grooves in flanges 52, 54 respectively.

In accordance with the present invention, a first set of circumferentially spaced, radially directed ports 68 are located around sleeve 46 and a set of circumferentially spaced, axially directed ports 70 are located on the sleeve below ports 68.

Radially directed ports 68 are relatively large and of ample size to accommodate full flow rate from mixing chamber 60 to the spout outlet. Axially directed ports 70, on the other hand, are carefully sized to limit flow and to limit admission of particulate matter over a pre-selected size. For example, a typical diverter valve sleeve would have ten such axially directed ports 70 with a diameter of 0.039 inches designed to screen the flow and prevent the admission of particulates larger than that dimension, while permitting a screened flow of particles smaller than that dimension.

The interior of the sleeve 46 comprises a cylindrical passage 72. In order to shut off the flow of water to spout 42, the upper end of passage 72 is formed with a valve seat 74. In order to shut off the flow of water to the spray outlet, a lower valve seat 76 is formed on the inner sleeve wall. Lastly, flow regulating grooves 78 are formed longitudinally along the inner surface of the sleeve wall.

Referring now to the construction of plunger 48, the plunger comprises a cylindrical member with an upper flanged valve head 80 and a lower flanged valve head 82 disposed on either end of a cylindrical reduced diameter plunger wall 84. Plunger wall 84 has a first set of circumferentially spaced plunger ports 86 and a second set of circumferentially spaced plunger ports 88. Ports 86, 88 are axially spaced so that when plunger 48 is in the upper position shown, ports 86 are above the valve seat 74 on the upper end of the central passage 72, while ports 88 register with radially directed inlet ports 68.

Referring now to FIG. 4 of the drawing, reference numbers are the same as in FIG. 3, but plunger 48 is indicated in the lower position. In this position, inlet ports 86, 88 are blocked by the sleeve wall. Upper valve plunger O-ring 81 is seated on spout valve seat 74. Lower valve plunger O-ring 83 is unseated, but is acting in conjunction with the flow regulating grooves 78 as shown in FIG. 5.

FIG. 5 is a view taken in cross section through V—V. The lower diverter housing 36 encloses a lower sleeve wall extension 55, in which precisely formed flow regulating grooves 78 extend longitudinally. The O-ring 83 acts in cooperation with flow regulating grooves 78 in a known manner to regulate the flow by bulging or expanding into the grooves 78 under increased pressure differential across the O-ring to reduce the opening so as to maintain a substantially constant flow. The flow regulating grooves 78 are of such dimension that particulates smaller than those trapped by axially directed ports 70 will pass through the grooves 78 without becoming lodged in the grooves.

Operation

When water is supplied to inlet chambers 60 under pressure, plunger 48 rises to the upper position shown in FIG. 3, so that water can flow freely through the registered inlet ports 68, 88 into the transfer chamber inside valve plunger 80 and out ports 86 to spout outlet 42. In this position, valve head 82 with lower O-ring 83 is seated on lower valve seat 76.

When the spray valve is actuated, so that pressure in the spray outlet 24 is reduced, the areas on the respective valve heads 80, 82 are such that valve plunger 48 moves to the lower position shown in FIG. 4. In this position, flow to the spout outlet 42 is cut off by valve 80 with O-ring 81 seated on upper valve seat 74. Water flow from the mixing chamber 60 is blocked from flowing through the radially directed ports 68 and constrained to flow through the axially directed ports 70, and through the flow regulating grooves 78 to the spray outlet 24 as indicated by the flow arrow. Particulate matter larger than the selected size admitted through axially directed ports 70 is held temporarily in the mixing chamber 60 and not allowed to pass through ports 70 into the flow regulating grooves 78, where it could jam the movement of plunger 48. If the inlet pressure in the mixing chamber 60 varies, the pressure differential changes across O-ring 83 to regulate the flow so as to hold it substantially constant in a manner known in the art. Any large particulates screened out by ports 70 and trapped in chamber 60 will later be flushed out through the spout outlet when the spray is shut off.

Should the inlet pressure drop below a pre-determined value, while the spray valve is open, the areas on the plunger are such that the plunger will rise to seat on valve seat 76 to block flow of any contaminated water into the inlet, providing an anti-siphoning action.

Other modifications will occur to those skilled in the art. Although two water supply lines are shown for hot and cold water, the arrangement will work equally well with a single water supply line.

While the valve heads are shown supplied with O-rings, they obviously could be of another type of valve head designed to cooperate with the valve seats. For example, while lower O-ring 83 performs a dual function of sealing with valve seat 76 in the upper position and regulating the flow with grooves 78 in the lower position, a beveled valve head could perform the former sealing function, while an O-ring could perform the latter flow regulating function.

Other modifications will occur to those skilled in the art, and it is desired to secure in the appended claims all such modifications as fall within the true spirit and scope of the invention.

What is claimed is:

1. A diverter valve adapted to be received within a faucet assembly having at least one water inlet, a spout outlet and a spray outlet, said diverter valve comprising:

a cylindrical valve sleeve having a sleeve wall communicating at an upper end thereof with said spout outlet, at a lower end thereof with said spray outlet, and along a central portion thereof with said water inlet, said sleeve defining a plurality of first inlet ports and a plurality of second inlet ports both communicating with said water inlet, a spout valve seat defined in said sleeve wall, a spray valve seat defined in said sleeve wall, and a plurality of flow regulating grooves defined in said sleeve wall; and a cylindrical valve plunger having a plunger wall dimensioned to slide axially with close clearances within said sleeve and defining a transfer chamber within the plunger wall, said plunger having a lower valve head arranged to seal the spray valve seat when the plunger is in an upper axial position, said plunger having an upper valve head arranged to seal the spout valve seat when the plunger is in a lower axial position, a plurality of third and fourth axially spaced ports defined in the plunger wall and communicating with said transfer chamber, said third and fourth ports being arranged to admit water from the first inlet ports into the transfer chamber and from the transfer chamber to the spout outlet when the plunger is in the upper position and to be blocked when the plunger is in the lower position, said second inlet ports being arranged to admit a screened flow of water between the sleeve and plunger to the spray outlet, said lower valve head being adapted to cooperate with said flow regulating grooves to regulate said screened flow when the plunger is in the lower position.

2. The diverter valve according to claim 1, wherein said sleeve wall has a smaller diameter wall portion forming close clearances with the plunger wall and a larger diameter wall portion defining an annular space with the plunger wall, said second inlet ports directing said screened flow into said annular space.

3. The diverter valve according to claim 1, wherein said lower valve head is fitted with an O-ring, and wherein said flow regulating grooves comprise a plurality of circumferentially spaced axially extending grooves defined in said sleeve wall between said spray valve seat and the lower end of said valve sleeve, the O-ring being dimensioned to regulate flow by bulging into said grooves when subjected to a pressure differential thereacross.

4. The diverter valve according to claim 1, wherein said upper valve head is fitted with an O-ring arranged to seat on the spout valve seat and seal flow to the spout outlet when the plunger is in a lower axial position.

5. The diverter valve according to claim 1, wherein said lower valve head is fitted with an O-ring arranged to seat on the spray valve seat and seal flow to the spray outlet when the plunger is in the upper position, and wherein said same O-ring is arranged and dimensioned to cooperate with said flow regulating grooves to regulate said screened flow when the plunger is in the lower position.

6. The diverter valve according to claim 5, wherein said flow regulating grooves comprise a plurality of circumferentially spaced axially extending grooves defined in said sleeve wall between said spray valve seat and the lower end of said valve sleeve, the O-ring being dimensioned to regulate flow by bulging into said grooves when subjected to a pressure differential thereacross.

7. The diverter valve according to claim 1, wherein said second inlet ports are substantially axially directed and circumferentially spaced around said sleeve and are so dimensioned to screen and trap particulate material of a size large enough to become entrapped in said flow regulating grooves.

8. The diverter valve according to claim 1, wherein said first inlet ports are substantially radially directed and circumferentially spaced around the valve sleeve, and wherein said second inlet ports are substantially axially directed and circumferentially spaced around the valve sleeve.

9. A diverter valve adapted to be received within a faucet assembly having at least one water inlet, a spout outlet and a spray outlet, said diverter valve comprising:

a cylindrical valve sleeve having a sleeve wall defining a central passage therethrough, said central passage communicating at an upper end thereof with said spout outlet and at a lower end thereof with said spray outlet, a central wall portion of said sleeve wall communicating on the outer surface thereof with said at least one water inlet, said central wall portion having a plurality of substantially radially directed inlet ports and a plurality of substantially axially directed inlet ports, a spout valve seat at the upper end of said central passage, a spray valve seat axially spaced from said spout valve seat on the other side of said central wall portion, and a plurality of circumferentially spaced flow regulating grooves defined in said sleeve wall between the spray valve seat and the lower end of the central passage; and a cylindrical valve plunger having a plunger wall dimensioned to slide axially with close clearances within said sleeve wall, said plunger having a transfer chamber closed at opposite axial ends of said plunger wall, a lower valve head arranged to seal the spray valve seat when the plunger is in an upper axial position, an upper valve head arranged to seal the spout valve seat when the plunger is in a lower axial position, a plurality of plunger inlet ports and a plurality of plunger outlet ports defined in the plunger wall and communicating with said transfer chamber, said plunger inlet ports and plunger outlet ports being axially spaced from one another and arranged to register with the upper end of the central passage and with said radially directed inlet ports respectively when the plunger is in said upper position so as to admit water from the water inlet through the transfer chamber to the spout outlet, and to be blocked when the plunger is in said lower position, said axially directed inlet ports being arranged to screen and admit a screened flow of water between the sleeve and plunger to the spray outlet, said lower valve head being adapted to cooperate with said flow regulating grooves to regulate said screened flow when the plunger is in the lower position.

10. The diverter valve according to claim 9, wherein said sleeve central wall portion is of a smaller diameter forming close clearances with the plunger wall and wherein said sleeve has a larger diameter wall portion defining an annular space with the plunger wall, said axially directed inlet ports directing said screened flow into said annular space.

11. The diverter valve according to claim 9, wherein said lower valve head is fitted with an O-ring, the O-ring being dimensioned to regulate flow by bulging into said grooves when subjected to a pressure differential thereacross.

12. The diverter valve according to claim 9, wherein said upper valve head is fitted with an O-ring arranged to seat on the spout valve seat and seal flow to the spout outlet when the plunger is in the lower position.

13. The diverter valve according to claim 9, wherein said lower valve head is fitted with an O-ring arranged to seat on the spray valve seat and seal flow to the spray outlet when the plunger is in the upper position, and wherein said same O-ring is arranged and dimensioned to cooperate with said flow regulating grooves to regulate said screened flow when the plunger is in the lower position.

14. The diverter valve according to claim 9, wherein said axially directed inlet ports are circumferentially spaced around said sleeve and are so dimensioned to screen and trap particulate material of a size large enough to become entrapped in said flow regulating grooves.

* * * * *